(12) United States Patent
Borovskikh

(10) Patent No.: US 8,925,406 B1
(45) Date of Patent: Jan. 6, 2015

(54) DEVICE FOR THE TRANSMISSION OF TORQUE FROM A DRIVING SHAFT TO A DRIVEN SHAFT

(71) Applicant: Valeriy Borovskikh, Moscow (RU)

(72) Inventor: Valeriy Borovskikh, Moscow (RU)

( * ) Notice: Subject to any disclaimer, the term of this patent is extended or adjusted under 35 U.S.C. 154(b) by 0 days.

(21) Appl. No.: 14/036,595

(22) Filed: Sep. 25, 2013

(51) Int. Cl.
 *F16H 21/12* (2006.01)
 *F16H 21/14* (2006.01)

(52) U.S. Cl.
 CPC ............... *F16H 21/14* (2013.01); *F16H 21/12* (2013.01)
 USPC .................................................. 74/68; 74/67

(58) Field of Classification Search
 CPC ..................................................... F16H 21/12
 USPC ........................................................... 74/68
 See application file for complete search history.

(56) References Cited

U.S. PATENT DOCUMENTS

| | | | | |
|---|---|---|---|---|
| 2,203,975 A | * | 6/1940 | Young | 105/37 |
| 3,396,988 A | * | 8/1968 | Kroening | 280/93.502 |
| 4,523,486 A | * | 6/1985 | Bueno | 74/87 |
| 4,753,628 A | * | 6/1988 | Gore | 474/112 |

FOREIGN PATENT DOCUMENTS

WO    WO 2009123551 A1 * 10/2009  ............. F16H 21/12

* cited by examiner

*Primary Examiner* — William Kelleher
*Assistant Examiner* — Terence Boes
(74) *Attorney, Agent, or Firm* — Nadya Reingand; Yan B. Hankin

(57) ABSTRACT

A device to transmit torque from a driving shaft to a driven shaft includes not less than three respective eccentrics secured to each of the shafts, and cable-type connecting rods. The eccentrics can be angularly offset by up to 50 degrees between each other to reduce vibrations. The cable-type connecting rods connect via bearings the eccentrics of the driving and driven shafts and operate solely in tension. Increasing of the unit loads and reduction in weight of the connecting rods and counterweights is provided. Up to twelve eccentrics are secured to each of the shafts in order to increase the uniformity of torque transmission to the driven shaft.

13 Claims, 8 Drawing Sheets

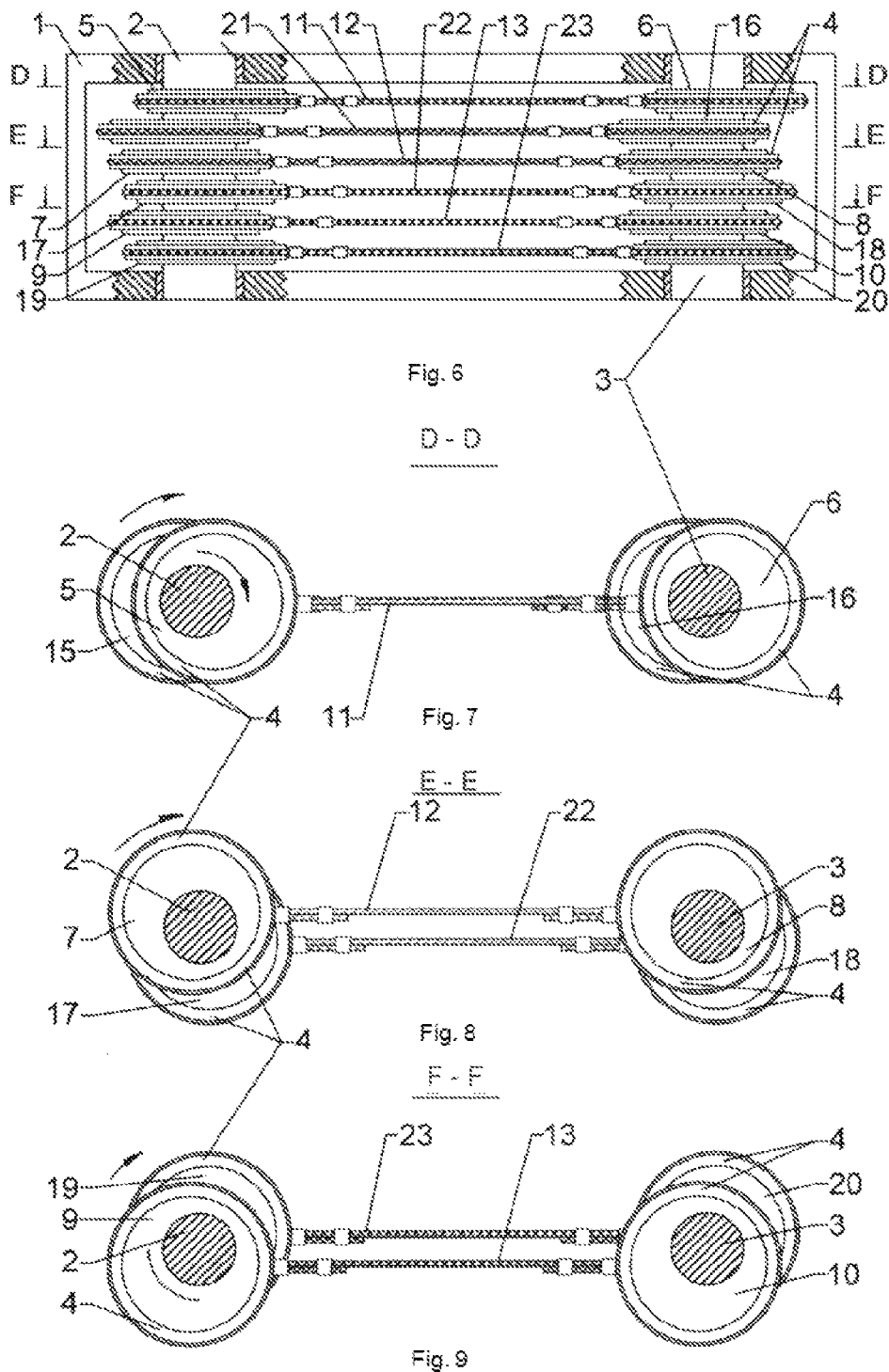

DEVICE FOR THE TRANSMISSION OF TORQUE FROM A DRIVING SHAFT TO A DRIVEN SHAFT

CROSS-REFERENCE TO RELATED APPLICATION

The current application is a continuation-in-part of U.S. Ser. No. 13/635,673 by the same inventor.

FIELD OF THE INVENTION

This invention relates to the field of mechanical engineering, specifically, to transmission of a torque from a driving shaft to a driven shaft. The invention describes at least three eccentrics mounted on each shaft and cables connecting the respective eccentrics on each shaft via the bearings.

BACKGROUND OF THE INVENTION

Currently, transmission of torque between parallel drive shafts and driven shafts positioned at a distance of up to several meters from each other is achieved by means of a transmission shaft, which typically is installed perpendicularly to the shafts and connected to each shaft through angular gearboxes. The fact that in such configuration the torque changes direction twice decreases the efficiency coefficient of the device, especially if gears of the angular gearboxes are of a hypoid type, for which the teeth of the gears roll with slippage. The method, popular in the design of steam locomotives, is never used in modern vehicles.

The drive wheel of a locomotive, powered by a connecting rod from the piston of the steam engine, is connected by a coupling rod to the other wheel and by these means sends torque to a parallel shaft.

One of the reasons why the transfer of torque by connecting rods fails in modern vehicles is the weight of the connecting rods, which grows proportionally to the distance between the shafts. Moreover, the use of connecting rods leads to creation of unbalanced forces which vary in strength and direction, thus requiring the use of counterweights that significantly increase the overall weight of the vehicle. This becomes apparent from the study of locomotive drive wheels design, where one side of the side of connecting rod is connected to wheel axle (that connected to the rim of the wheel by spokes), and another side of the rod is coupled to the cast disk.

The U.S. Pat. No. 2,203,975 by Young describes a device where, in order to balance the torque for two drive wheel pairs, the axles are implemented as crankshafts with three cranks offset by 120 degrees, while the cranks connected by connecting rods. Such placement of cranks every 120 degrees allows consistent transmission of torque. However, for such configuration, the transmission of torque by one or two connecting rods creates particular moments with a zero torque, which is undesirable. The crankshafts described by Young can be replaced by eccentrics with an equal to the crankshaft eccentricity, or being used in combination if needed. Thus, in MPK F16C 3/04 one can find a description of crankshafts, shafts with eccentrics, cranks, eccentrics with some of their characteristics being functionality grouped together. Hereinafter, for simplicity we assume that functionality of eccentrics is applicable to cranks (crankshafts) and vice versa.

Presently, the mentioned connecting rods used in industry experience alternating forces during its operation. They are manufactured from steel alloys with a specific strength up to 100 kg/mm$^2$, which is close to the maximum strength for such material. It should be noted that there are materials, such as steel cable wires on the market, specifically designed to operate in tension, with a specific strength of 200 kg/mm$^2$.

The use of flexible eccentric sectors secured on the driving and driven shafts for the torque transfer has been disclosed in U.S. Pat. No. 4,753,628 by Gore, where each sector on the driving shaft and the corresponding sector on the driven shaft are connected by a circular cable. Such device has following disadvantages:

i) Each cable become tense at the moment when the torque is transferred, however, the same cable becomes loose when the torque is transferred by other cables. When this cable resumes the torque transfer, the driving segment is (slightly) displaced against the driven segment and after a number of cycles such accumulated displacement will impair the functionality of the device.

ii) Each circular cable in the set is slightly differs from other, which further increases the rate of accumulating the mentioned displacement (driving segments against the corresponded driven ones).

iii) Such structure (disclosed by Gore) requires a synchronized rotation of the driving and driven shafts. The synchronization with a V-belt suggested by the author will extend the time of torque transmission only insignificantly since it is based on a friction behavior of the belt. It is well-known that V-belts transmit force with a slight slippage making the angular offset of the driving shaft against the driven shaft inevitable. The alternative synchronization option proposed by the author of the present invention implies using a whole eccentric having a two self-tightening cable turns. Such option is also based on the frictional properties of the synthetic cable, which are not sufficient for precise operation. Accordingly, a gear belt or a chain is required to ensure continuous synchronization. Application of a complete eccentric without a bearing, as acknowledged by Gore will lead to a loss of the transferred torque due to the cable friction against the eccentric.

iv) The use of a gear belt or a chain for synchronization purposes is not suggested or recommended since it would lead to cable straining and sliding at the beginning of each force transmission cycle, leading to its wearing and failure.

The proposed invention overcomes above mentioned drawbacks by transferring the torque between respective eccentrics by cable through rotating or friction type bearings. Another important difference is that the three eccentrics (or cranks) that transmit force to the cables via the bearings automatically synchronize the rotation of the driving and driven shafts.

The current invention overcomes the mentioned negative aspects of using connecting rods.

BRIEF DESCRIPTION OF DRAWINGS

FIG. 1. A device for the transmission of torque via use of three cable-type connecting rods, shown on the drawing (top-down view) in.

FIG. 6 Device for the transfer of torque using six non-rigid cable-type connecting rods is shown (top-down view).

FIG. 7. Cross-section from D-D of FIG. 6.

FIG. 8. Cross-section from E-E of FIG. 6.

FIG. 9. Cross-section from F-F of FIG. 6.

SUMMARY THE INVENTION

Figure 1:
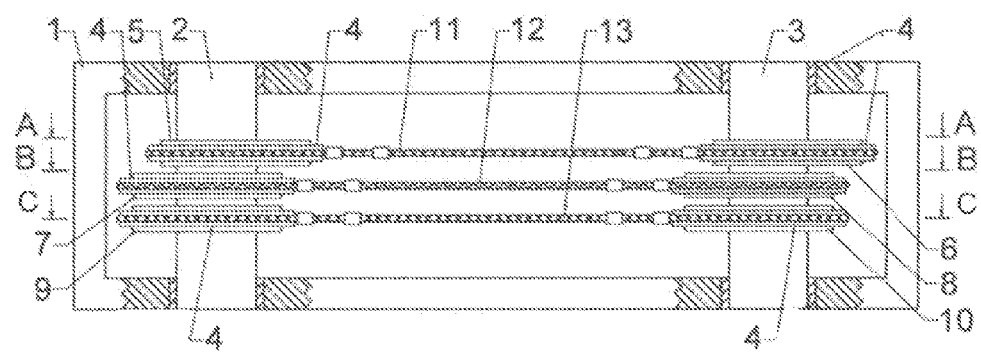
Figure 2:
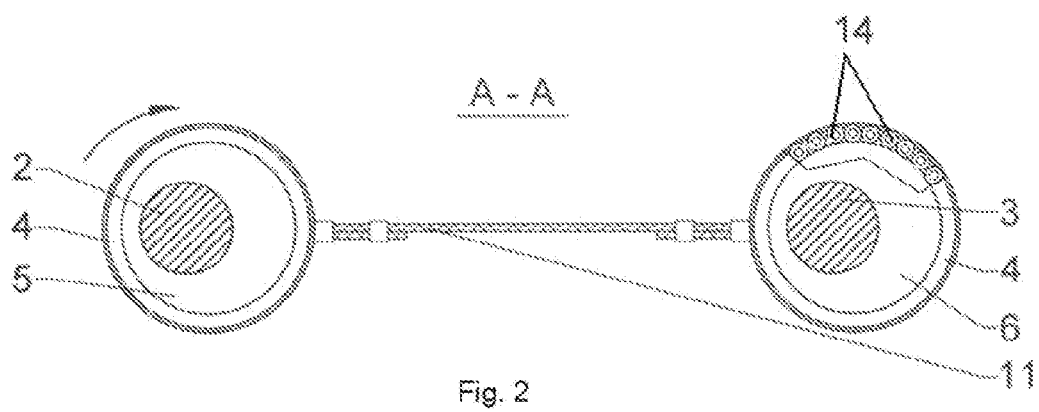
FIG. 2. A cross-section from A-A, FIG. 1.
Figure 3:
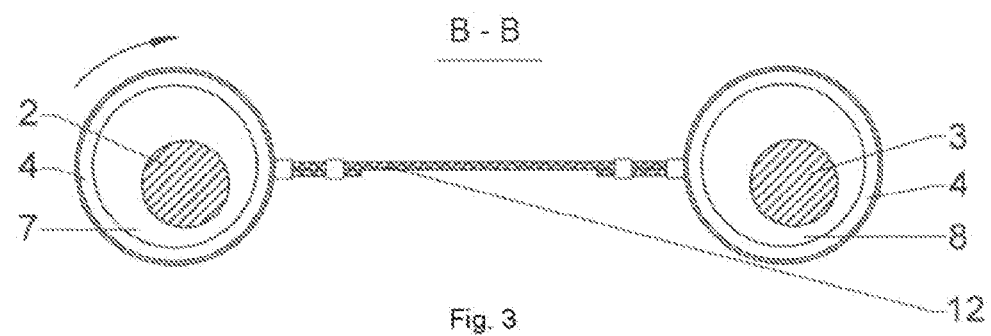
FIG. 3. A cross-section from B-B of FIG. 1.
Figure 4:
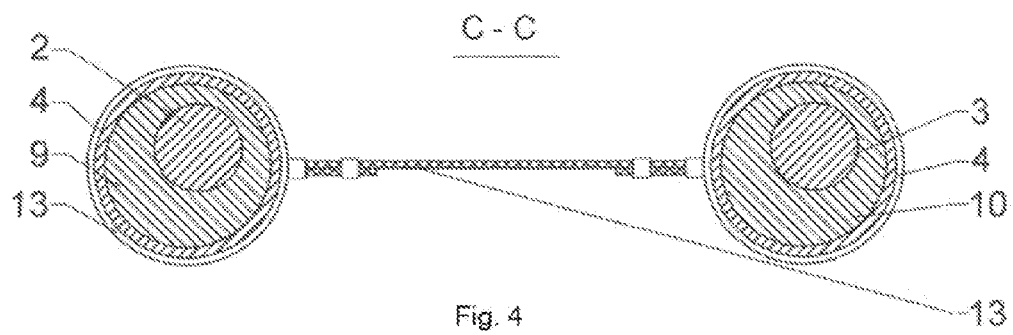
FIG. 4. A cross-section from C-C of FIG. 1.

A device for a synchronized transfer of a torque from a driving shaft to a driven shaft using more than three eccentrics, rigidly attached to the shafts is disclosed. The all eccentrics on the each shaft have a relative $2\pi/N$ eccentricity, each coupled to bearings which eliminates a component of the torque which is perpendicular to the shafts. The device also includes non-rigid cables, operating solely in tension and serving as flexible connecting elements firmly connecting a single bearing of the eccentric of the driving shaft with a respective single eccentric's bearing on the driven shaft. At least one pair of the eccentrics of the driving shaft has a relative non-zero eccentricity offset of less than 50 degrees to eliminate a potential vibrational resonance with the device itself.

The non-rigid cables and the bearings operate simultaneously, keeping a distance between the shafts constant, also enabling an automatic synchronization of the shafts. Twelve eccentrics can be mounted on each shaft to provide a uniform and evenly distributed torque in either direction of the shafts' rotation. The cables have a lateral degree of freedom allowing a relative movement of the driving and driven shafts in the direction perpendicular to the direction of the non-rigid cables. The cables can be made of Aramid fibers or carbon fibers or constructed of multiples fibers, filaments and fiber wraps.

A device is also capable of synchronized torque transfer between shafts connected by not less than three flexible cables, while each cable forms two closed loops around two corresponding bearings on the driving shaft and the driven shaft. Each bearing is connected to a corresponding eccentric via a ring of bearing balls.

The eccentrics on the each shaft have a $2\pi/N$ eccentricity offset between each other with the equal angular orientation of the corresponding eccentrics on each shaft. The all cables provide a constant tension with an overlapping torque, enabling an automatic synchronization of the shafts and eliminating a vertical component of the torque using the described bearing configuration. The cables can sustain pressure of up to 450 kg/cm$^2$ and can be made out of Kevlar Aramid fiber.

A method for synchronized transfer of a torque from a driving shaft to a driven shaft is also disclosed. The method is based on the connecting a three pairs of bearings by three corresponding flexible cables. The method also includes connecting bearing to the driving and driven shafts by corresponding eccentrics with a 120 degrees offset. The connected eccentrics have the same respective angular orientation. The rotating of the driving shaft caused a rotation of the driven shaft connected to the driving shaft via all three cables operating in a constant tension. The method also describes the connecting of the eccentrics by a ring of bearings balls and cables having a lateral degree of freedom allowing relative movement of the shafts in the direction substantially perpendicular to the direction of the cables, which can be made of Aramid fibers or carbon fibers.

DETAILED DESCRIPTION OF THE PREFERRED EMBODIMENT

The disclosed invention proposes increasing unit loads, by replacing the rigid connecting rods with flexible cables, as shown in FIG. 1, where the following elements are shown: 1—power circuit, 2—driving shaft, 3—driven shaft, 4—bearing, 5, 7, 9—eccentrics of the driving shaft, 6, 8, 10—eccentrics of the driven shaft, 11—cable-type connecting rod between the 5 and 6 eccentrics, 12—cable-type connecting rod between the 7 and 8 eccentrics, 13—cable-type connecting rod between the 9 and 10 eccentrics. To enable efficient operation (continuous transfer of the torque) of the flexible cables for torque transfer, three eccentrics are mounted on a drive shaft and a driven shaft, respectively, having a 120 degree eccentricity offset from each other, as shown in FIG. 1, FIG. 2, FIG. 3, and FIG. 4.

The bearings, eliminating a vertical component of the torque which is perpendicular to a plane that includes both driving and the driven shafts. The bearings are include bearing balls (shown as element 14 in the FIG. 2).

The proposed non-rigid-cables and the bearings are operating simultaneously, essentially transferring the torque between the driving shaft and the driven shaft while also automatically preserving a constant distance between the driving shaft and the driven shaft.

Moreover, the non-rigid-cables eccentrics and the bearings, operating simultaneously, automatically provide a synchronization of the driving shaft and the driven shaft.

Moreover, the proposed structure allows offsetting at a certain angle the position of one or two eccentrics on the driving shaft and the corresponding eccentrics on the driven shaft. This offset should be less than the overlapping impulse that equals 60 degrees. Thus, the cumulative angle offset should not exceed 50 degrees.

By using steel cables as connecting rods it is possible to reduce the weight of the connecting rods and counterweights by half, at least. The cables can be also made from alternative materials, such as a carbon-fiber or made from aramid (Kevlar—the brand name marketed by the DuPont Company). Aramid fibers have specific strength up to 450 kg/cm$^2$, specific weight being 1.45 g/cm$^3$, which is 5.38 times less than the specific weight of steel. Accordingly, using Aramid cables as connecting rods allows a 24-fold weight reduction of connecting rods and counterweights.

The eccentrics on the each shaft have a $2\pi/N$ eccentricity offset between each other with the equal angular orientation of the corresponding eccentrics on each shaft. The all cables provide a constant tension with an overlapping torque, enabling an automatic synchronization of the shafts and eliminating a vertical component of the torque using the described bearing configuration. The cables can sustain pressure of up to 450 kg/cm$^2$ and can be made out of Kevlar Aramid fiber.

Another feature of the disclosed invention is implementation of the connecting cables strictly in tension mode, thus enabling to transfer the torque only during 180-degree turn of the shaft. Such operation is provided by positioning of the eccentrics (on each shaft) at the consequent 120-degree offset to each other. By these means, it is possible to create an overlap in such a manner that each consequent (second versus first, third versus second, first versus third) eccentric starts pulling well in advance of the completion of the previous (first versus second, second versus third, third versus first) eccentric's pulling motion.

Replacing the steel torque-transmitting connecting rods (which are stretched and contracted during their operation), by a flexible connections that transmit torque only when stretched, reveals the new following features:

i) Cables transmit force only when stretched, and the three cables form an entire structure of a rigid triangle at each moment of time, keeping all the cables under tension and transferring the torque from the driving shaft to the driven shaft as efficiently as in a case of rigid connecting rods. Accordingly, the proposed invention entirely replaces the conventional rigid connecting rods structure that operates in 'stretch-contract' fashion.

ii) Securing cables on the eccentrics via the bearings (see FIG. 1) automatically synchronizes the rotation of the driving and driven shafts and no additional synchronization is required.

iii) A single cord per each couple of respective eccentrics is sufficient to transmit the torque.

iv) The cables on the bearing outer races do not change their position during the operation, and, therefore, do not wear with time.

Figure 5:
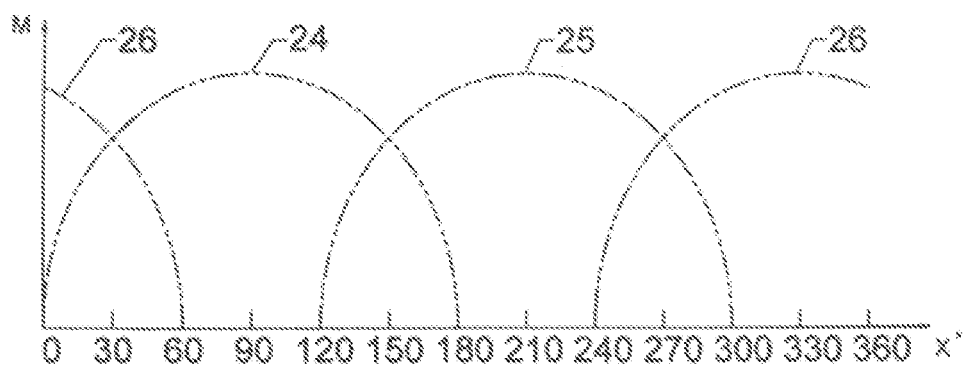
FIG. 5. A chart of torque variance of the driven shaft in relation to angular rotation of a three cable-type connecting rod setup.

Such arrangement provides a constant and smooth torque transfer to the driven shaft during its complete rotation, since the eccentric pulling actions are overlapped by 60 degrees. FIG. 5 shows the transmitted torque as a function of the driven shaft's angular rotation. Such uneven torque transmission (i.e. torque fluctuation) can increase a vibration of the mechanism and, in some cases, destroy the device during the resonant vibration. With the reference to the FIG. 5, 24—is a torque variance during operation of cable-type connecting rod 11, 25—torque variance during operation of cable-type connecting rod 12, 26—torque variance during operation of cable-type connecting rod 13.

In the disclosed invention, the vibration, induced by connecting rods, can be lowered by the way of angular offsetting of one or two eccentrics on the drive shaft relatively to the corresponding eccentrics on the driven shaft. This offset has to be less than the mentioned pulling motion's 60-degree overlap. Accordingly, the combined angular offset should not exceed 50 degrees.

In order to further decrease torque fluctuations of the driven shaft it is desirable to use more than three eccentrics.

In yet another one embodiment of the invention, when a high-value of torque is required, the twelve eccentrics can be used. Since each cable operates during only a half of the eccentric's rotation, the twelve cables will do an equivalent work of the six regular connecting rods. The balance of six connecting rods in a conventional six-cylinder internal combustion engine is considered to be optimal and being widely used despite of its complexity and a larger angular torque variance on the connecting rods compared to disclosed cable-type design. When using twelve eccentrics, several connecting rods will participate in torque transfer simultaneously, also allowing the cables' thickness reduction. In the disclosed embodiment, the transferred torque variance will not exceed one percent.

Among possible embodiments of the disclosure, a configuration having from six to twelve eccentrics positioned in pairs with 180 degree offset from each other has a particular importance. Under such design, inertial forces of the connecting rods and centrifugal forces of the eccentrics effectively cancel out each other, see FIG. 6, FIG. 7, FIG. 8, and FIG. 9, where the eccentrics and connecting rods positioned analogously to those shown in FIG. 1 and labeled with the same numbers: 15—eccentric rotated 180 degrees to eccentric 5, 16—eccentric rotated 180 degrees to eccentric 6, 17—eccentric rotated 180 degrees to eccentric 7, 18—eccentric rotated 180 degrees to eccentric 8, 19—eccentric rotated 180 degrees to eccentric 9, 20—eccentric rotated 180 degrees to eccentric 10, 21—cable-type connecting rod of eccentrics 15 and 16, 22—cable-type connecting rod of eccentrics 17 and 18, 23—cable-type connecting rod of eccentrics 19 and 20.

Figure 10:
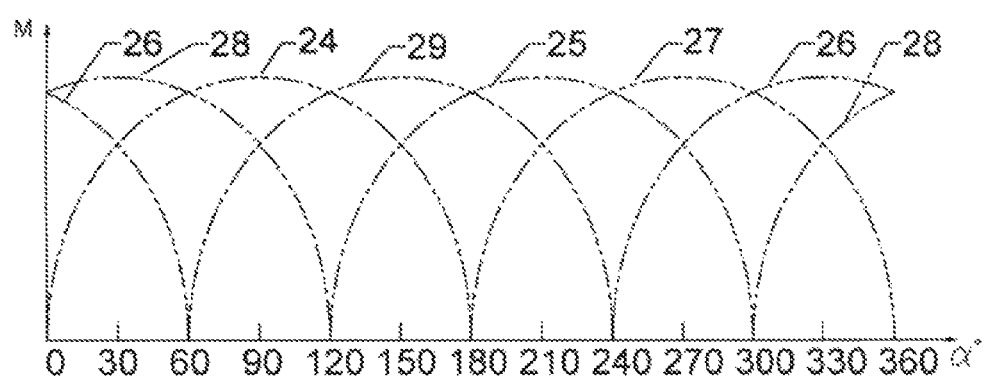
FIG. 10. Chart of torque variance of the driven shaft in relation to angular rotation of a six cable-type connecting rod design.

By this means, the consistency of the transferred torque remains unchanged (see FIG. 10) and, as a result, there is no need for counterweights to be used. In other words, in the proposed design, the torque transfer provided by the disclosed cable-type rods through a corresponding pair of eccentrics is equivalent to the torque transfer provided by a steel connecting rod. With the reference to the FIG. 10, the elements are: 24—torque variance due to cable-type connecting rod 11, 25—torque variance due to cable-type connecting rod 12, 26—torque variance due to cable-type connecting rod 13, 27—torque variance due to cable-type connecting rod 21, 28—torque variance due to cable-type connecting rod 22, position 29—torque variance due to cable-type connecting rod 23. For example, the two Aramid-fiber cable-type rods permit a 12-fold reduction in weight compared to steel rods.

In the most obvious embodiment of the invention, the of cable-type connecting rods can be used in a (steam) locomotive, but due to the low performance index of the locomotive steam engines, steam locomotives are coming out of use. Theoretically, it would be possible to replace the steam engines with free-piston gas generators with performance indexes comparable to ones of diesel engines, but as of today, usable machines yielding power levels suitable for railroad transportation do not exist. However, the need for use of connecting rods made of Aramid fibers remains for railway vehicles.

One such need will be observed in the example of the locomotive of type 2TE116, for example, where each locomotive section is equipped with a diesel generator installed on the frame and six electric motors transferring the torque distributed through gears among the six leading pairs of wheels. The electric motor and the gearbox (speed transformer) are connected to the wheel pair with the help of a supporting-axial chassis (overhung axle countershaft), whereby one of the electric motor's supports is resting on the frame, and the second is rigidly connected to the wheel pair. The overall weight of the unsprung part is 4.25 tones, which negatively affects the mileage of the electric motor, gearbox, and wheel pair, as well as the lifespan of the railroad track.

The alternative is to install the towing electric motor and the gearbox on the frame of the rail car, with a block of eccentrics installed on the output shaft of the gearbox, and this block by Aramid fiber cables is connected to the block of eccentrics installed on the wheel pair. The weight of the unsprung masses in this case equals to the weight of the wheel pair plus the weight of the block of eccentrics installed on its axis, whose weight is around ten kilograms. This will positively affect the mileage of the electric motor, gearbox, and wheel pair, as well as the lifespan of the railroad track. When in motion the non-rigid cable-type connecting rods allow the wheel pair to shift slightly relative to the frame (FIGS. 11 and 12).

Figure 11:
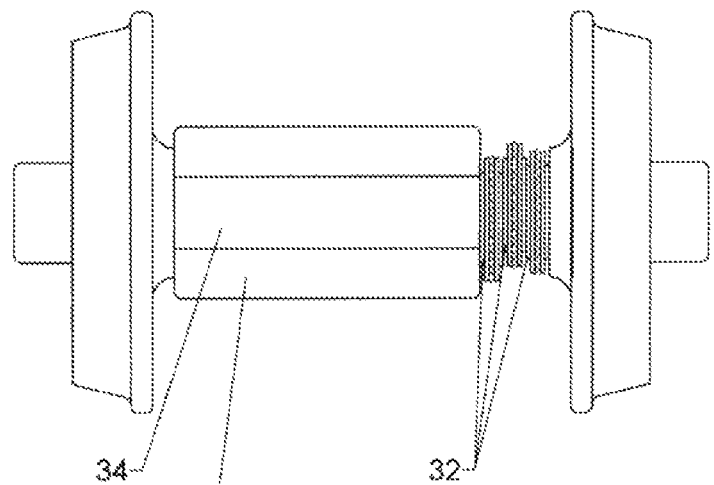
FIG. 11. A possible industrial application of this invention with the non-rigid cable-type connecting rods.
Figure 12:
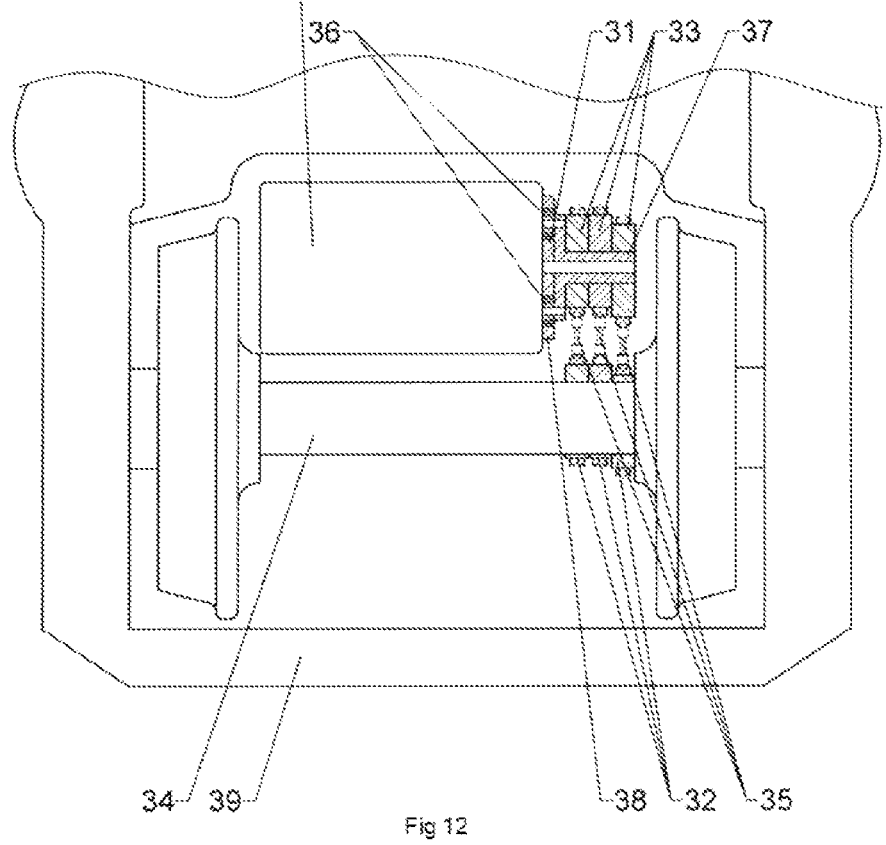
FIG. 12. A possible industrial application of this invention, with the non-rigid cable-type connecting rods; different view.

A possible industrial application of this invention is shown in FIG. 11 and FIG. 12, where the locomotive's wheel pair is rotated by three cable-type connecting rods made of aramid fibers. With the reference to the FIG. 11 and FIG. 12, the elements are as follows: 30—electric motor, 31—planetary gearbox, 32—block of eccentrics on the wheel pair axle, 33—block of eccentrics on the outgoing gearbox shaft, position 34—wheel pair, 35—cable-type connecting rods, 36—satellites, 37—output shaft of the gear-carrier, 38—central wheel, 39—cart frame.

Although several exemplary embodiments have been herein shown and described, those of skill in the art will recognize that many modifications and variations are possible without departing from the spirit and scope of the invention, and it is intended to measure the invention only by the appended claims.

The invention claimed is:

1. A device for a synchronized transfer of a torque from a driving shaft to a driven shaft, comprising:
   N driving eccentrics, rigidly attached to the driving shaft and N driven eccentrics rigidly attached to the driven shaft, wherein N≥3; the eccentrics each comprising a corresponding eccentric hole containing the driving and the driven shaft respectively;
   wherein a totality of said eccentrics of the driving shaft have an eccentricity offset of $2\pi/N$ between each other;
   wherein a totality of said eccentrics of the driven shaft have an eccentricity offset of $2\pi/N$ between each other;
   wherein said device is further comprised of bearings being coupled to each of the eccentrics;
   wherein said bearings eliminate a vertical component of the torque, where the vertical component is perpendicular to a plane formed by both the driving shaft and the driven shaft;
   wherein said device is further comprised of non-rigid cables, and said cables constantly operate in tension;
   wherein said cables serve as flexible connecting elements,
   wherein each of the said flexible connecting elements interconnects one of a single eccentric located at the driving shaft with a respective eccentric located at the driven shaft via the bearings;
   wherein said non-rigid cables and the bearings operate simultaneously, preserve a constant distance between the driving shaft and the driven shaft and perform an automatic synchronization of the driving shaft and the driven shaft;
   wherein at least one pair of the eccentrics of the driving shaft has a relative non-zero eccentricity offset of less than 50 degrees between each other to eliminate a vibrational resonance with the device itself;
   wherein said bearings surround an outermost periphery of the eccentrics.

2. The device of claim 1, further comprising:
   twelve eccentrics that are mounted on each of the shafts providing a uniform and evenly distributed delivery of a continuous torque in either direction of the shafts' rotation.

3. The device of claim 1, further comprising:
   non-rigid cables having a lateral degree of freedom, the degree of freedom allowing a relative movement of the driving and driven shafts in the direction perpendicular to the direction of the non-rigid cables.

4. The device of claim 1, wherein the non-rigid cables are made of aramid fibers or carbon fibers.

5. The device of claim 1, further comprising:
   the non-rigid cables consisting of a plurality of fibers, filaments and fiber wraps.

6. A device for a synchronized transfer of a torque from a driving shaft to a driven shaft, comprising:
   N flexible cables, N≥3, between the driving and the driven shaft;
   each cable having a first closed loop around a driving bearing on the driving shaft side and a second closed loop around a driven bearing on the driven shaft side, each driving bearings is connected to the corresponding driven bearing by a single cable;
   each bearing connected to a corresponding eccentric via a ring consisted of bearing balls;
   eccentrics of the driving shaft having an eccentricity offset by $2\pi/N$ between each other, eccentrics of the driven shaft having an eccentricity offset by $2\pi/N$ between each other and angular orientation of the corresponding eccentrics of the driving and the driven shafts is essentially the same;
   the eccentrics each comprising a corresponding eccentric hole containing the driving and driven shaft respectively;
   and wherein an automatic synchronization of the driving shaft and the driven shaft is achieved by operating all cables always in tension with overlapping torque and eliminating a vertical component of the torque via implementation of the described bearing configuration;
   wherein said bearings surround an outermost periphery of the eccentrics.

7. The device of claim 6, wherein the cables are sustain a pressure up to 450 kg/cm².

8. The device of claim 7, wherein the cables are made out of Kevlar aramid fiber.

9. A method of a synchronized transfer of a torque from a driving shaft to a driven shaft, comprising:
   attaching a first end of a first flexible cable to a first bearing and a second end to a second bearing;
   attaching a first end of a second flexible cable to a third bearing and a second end to a forth bearing;
   attaching a first end of a third flexible cable to a fifth bearing and a second end to a sixth bearing;
   attaching the first, the third and the fifth bearing to the driving shaft via corresponding eccentrics, the eccentrics each comprising a corresponding eccentric hole containing the driving and driven shaft respectively;
   the eccentrics are positioned with 120 degrees offset between eccentrics;
   attaching the second, the fourth and the sixth bearing to the driven shaft via eccentrics, the eccentrics are positioned with 120 degrees offset between eccentrics;
   the first and the second, the third and the fourth, the fifth and the sixth eccentrics have the same angular orientation, respectively;
   and rotating the driving shaft thus causing a rotation of the driven shaft connected to the driving shaft via all three cables operating in constant tension,
   wherein said bearings surround an outermost periphery of the eccentrics.

10. The method of claim 9, wherein the bearings are connected to the eccentrics via a ring consisted of bearings balls.

11. The method of claim 9, wherein the cables have a lateral degree of freedom, the degree of freedom allowing relative movement of the driving and driven shafts in the direction substantially perpendicular to the direction of the cables.

12. The method of claim 9, wherein the cables are made of aramid fibers or carbon fibers.

13. The method of claim 9, wherein at least one pair of the eccentrics of the driving shaft has a relative non-zero eccentricity offset of less than 50 degrees between each other to eliminate a vibrational resonance with the device itself.

* * * * *